Feb. 18, 1969 V. VIOLA 3,427,968

POSTAGE METER TAPE FEEDING MECHANISM

Filed June 10, 1966 Sheet 1 of 4

Feb. 18, 1969 V. VIOLA 3,427,968

POSTAGE METER TAPE FEEDING MECHANISM

Filed June 10, 1966

United States Patent Office 3,427,968

Patented Feb. 18, 1969

3,427,968

POSTAGE METER TAPE FEEDING MECHANISM

Vito Viola, Oakland, Calif., assignor to Friden, Inc., a corporation of Delaware Filed June 10, 1966, Ser. No. 556,705

U.S. Cl. 101—228 7 Claims

Int. Cl. B41f 13/24

ABSTRACT OF THE DISCLOSURE

A tape feeding mechanism for a postage machine whereby the tape is moved by the print head from a supply roll, printed and, thereafter, severed to provide a tap strip of a predetermined length. A yieldable means normally enabling feeding of the tape during a printing operation becomes effective to prevent retraction of the tape supply following the severing of the strip therefrom and, upon depletion of the tape supply, to prevent a tape feed operation.

This invention relates to a tape control mechanism which is particularly adapted for use with a metered mail machine.

In machines of this type a postage indicia is printed on tape which is thereafter severed, to form strips to be affixed on various types of mail matter. It is now the practice in many such machines to move the leading edge of the tape from a nonprinting position to a printing position for the postage indicia impression. After printing, the tape is severed to provide a printed strip and the leading edge of the tape is then retracted to the nonprinting position, as disclosed in Patent No. 2,456,414.

In the arrangement disclosed herein, a simplified tape feed is provided wherein retraction of the tape is prevented and the depletion of the tape is detected to preclude subsequent tape printing operations. It is, therefore, an object of the present invention to provide an improved tape feed mechanism wherein movement of the tape is restricted to one direction and maintained in a given position following each feed operation.

Another object of the present invention is to provide an improved tape feed mechanism wherein depletion or looping of the tape is detected to disable the meter operation control means.

Other objects and advantages will be apparent from the following description of the preferred embodiment of the invention as illustrated in the accompanying drawings in which.

While this invention may be used in combination with various types of printing devices, it is preferably shown in combination with a postage meter of the type described in the Patent No. 3,363,549, issued to John F. Reus et al., Jan. 16, 1968.

Figures 2, 3, 4:
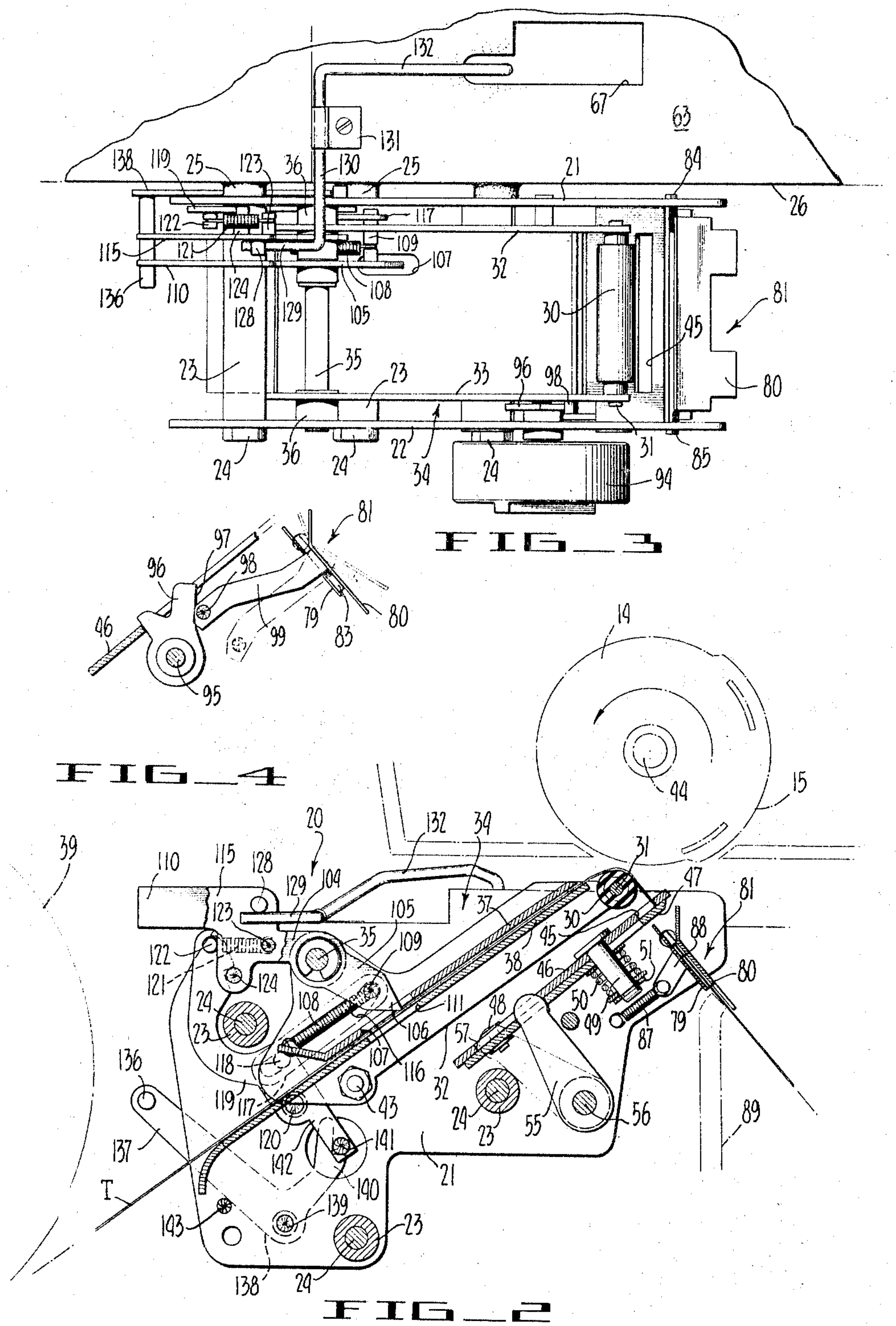
FIG. 2 is an elevational view of the tape control mechanism.
FIG. 3 is a plan view of the tape control mechanism.
FIG. 4 is a detail of the tape guide for a moistened or nonmoistened tape strip.

In the embodiment shown, the postage meter 10 (FIG. 1) is removably secured upon the base portion 12 and includes the rotary print head 14, shown in phantom line in FIG. 2, having printing die 15 secured thereon. A cyclic rotation of print head 14 is initiated in a well known manner with each depression of control key 16 (FIG. 1) to effect a printing of the postage indicia and town circle, as will be described thereinafter.

In the present invention, a tape control unit 20 (FIGS. 1 and 2) is provided for the purpose of printing postage on gummed tape and dispensing the tape in strips of a suitable length, moistened or nonmoistened as desired. The tape control unit 20 (FIGS. 2 and 3) comprises a pair of similar frame members 21 and 22 maintained in spaced parallel relationship by means of spacers 23 and secured by means of bolts 24 on similar bosses 25 integrally formed on the wall 26 of base portion 12. A platen 30, preferably of rubber is secured on a shaft 31 supported at its respective ends for free rolling movement in the upper end portion of side members 32, 33 of a tape guide bracket generally indicated at 34. Each side member 32 and 33 of bracket 34 is supported on a shaft 35 which, in turn, is supported at its respective ends in similar bearing bushings 36 secured on frame members 21 and 22. An upper guide plate 37 and lower guide plate 38 are each secured along its lengthwise edges to the respective side members 32 and 33 and serve to maintain the side members in spaced parallel relationship. The adjacent planar surfaces of the guide plates 37 and 38 are spaced one from the other sufficiently to permit tape T to move from the tape supply roll 39 therebetween and over platen roller 30.

The tape guide bracket 34 may be secured in position between frame members 21 and 22 by any suitable means, such as nuts and bolts 43 and suitable spacers (not shown) so that the side members 32 and 33 thereof are equally spaced from and parallel to respective members 21 and 22. With the postage meter 10 secured in its operative position upon the base portion 12, the platen roller 30 is axially parallel to the rotary print head shaft 44 (FIG. 2). Normally, with the print head 14 in its full cycle position, there is no contact between the print head and the platen roller 30. However, upon initiation of a postage metering operation and during the last half of the counterclockwise cyclic rotation of print head 14 (FIG. 2), the printing die 15, i.e., the arcuate portion having a greater radius, contacts the tape to print the postmark impression thereon while moving tape T from the supply roll 39.

As the tape T is threaded through the tape guide bracket 34 between guide plates 37 and 38 and over platen roller 30, the end of the tape is positioned within the cutter opening 45 of shear plate 46 and against the top surface of the cutter knife 47. Shear plate 46 is secured at its sides in respective frame members 21 and 22 in substantially parallel relationship to guide plates 37 and 38. The cutter knife blade 47 is maintained in contiguous sliding engagement with the shear plate 46 by means of a pair of pins 48 secured in a plate 46 and engaged in respective parallel elongated slots in the blade 47. Adjacent the right ends thereof (FIG. 2), the sliding contact of the knife blade 47 with shear plate 46 is maintained by means of a pin 49 supported in plate 46 and a compression spring 50 secured in place on pin 49 by means of a spring clip 51.

Figure 5:
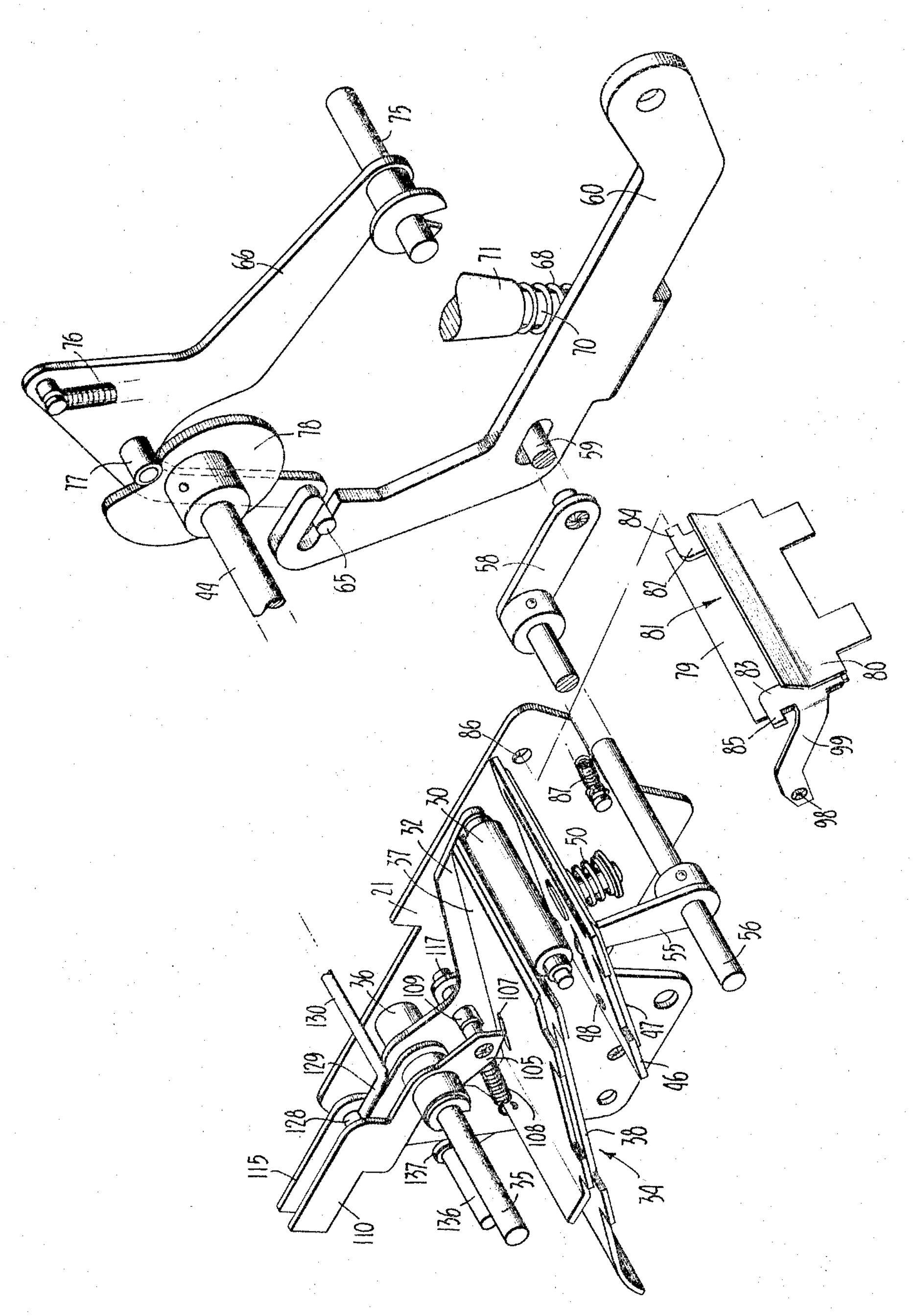
FIG. 5 is an isometric showing of the tape control mechanism and the cutter actuating means.

Normally, the cutter, or knife blade, 47 is in the position shown in FIG. 2. However, upon initiation of a postage metering operation and the cycle of rotation of the rotary print head 14, the blade 47 is retracted to enable the tape T to pass through the opening 45 in shear plate 46. For this purpose, an arm 55 (FIGS. 2 and 5) is secured on a shaft 56 with the rounded free end portion of the arm engaging in a slot in the knife blade 47 and extending into a suitable elongated slot 57 in shear plate 46. Shaft 56 is journalled at its outer end in frame member 22 and intermediate its ends in frame member 21 and in the wall 26 of the base portion 12. At its inner end, shaft 56 carries an arm 58 secured thereon and carrying a pin 59 engaged in an elongated slot in a lever 60 secured at its one end on a shaft 61 pivotally supported at its ends in each of two depending brackets 62 (FIGS. 6 and 7) integrally formed on the top plate 63 of base portion 12. The angularly upwardly formed free end of lever 60 extends through a suitable aperture 67 in the top plate 63 of the base portion 12 and is provided with an open end slot 64 for sliding engagement or disengagement with the pin 65 on the lower end of the depending arm of bellcrank lever 66 in the postage meter 10. A compression spring 68 serves to normally maintain slot 64 in position for engagement or disengagement of the pin 65 therewith upon installation or removal of the postage meter 10 on or from base portion 12. Spring 68, bearing against a laterally formed ear 69 of lever 60, resiliently urges the ear 69 into engagement with the head of a screw 70 threaded into a boss 71 integrally formed on the underside of plate 63, the screw 70 serving to retain spring 68 in position between the ear 69 and the boss 71.

In this downwardly urged position of the lever 60, knife blade 47 is in the closed position shown in FIG. 2. Upon initiation of a machine cycle of operation and during the initial 180° of rotation of the print head 14, the lever 60 is rocked clockwise (FIGS. 5 and 6) to retract knife blade 47 thereby enabling the movement of tape T through the opening 45 in shear plate 46 (FIG. 2). To this end, lever 66 is mounted for rocking movement on the shaft 75 secured within the framework of the postage meter 10. The relatively strong spring 76 serves to maintain roller 77 in engagement with the accelerated motion cam 78 secured on the rotary print head shaft 44. Thus, it can be seen that as rotary print head 14 and cam 78 are rotated counterclockwise (FIGS. 2 and 5), lever 60 is rocked clockwise, as fully described in the aforementioned Patent No. 3,363,549.

During the final 180° rotation of the rotary print head 14, the printing die 15 becomes effective to cause a postmark to be imprinted upon the tape T while moving the tape through the opening 45 in shear plate 46 and between tape guide plates 79 and 80 of tape deflector 81. Upon return of the rotary print head 14 to its full cycle position and the cam 78 to the position shown in FIG. 5, spring 76 becomes effective immediately to rock bellcrank lever 66 downwardly thereby actuating knife blade 47 to sever the tape.

At its ends, each of the guide plates 79 and 80 of deflector 81 (FIGS. 4 and 5) are secured in spaced relation to respective bars 82 and 83 of similar thickness. Each of the bars 82 and 83 is provided with laterally projecting lugs 84 and 85, respectively, adapted to engage in axially aligned circular apertures 86 in respective frame members 21 and 22. Thus, tape deflector 81 becomes rockable between frame members 21 and 22.

Figure 1:
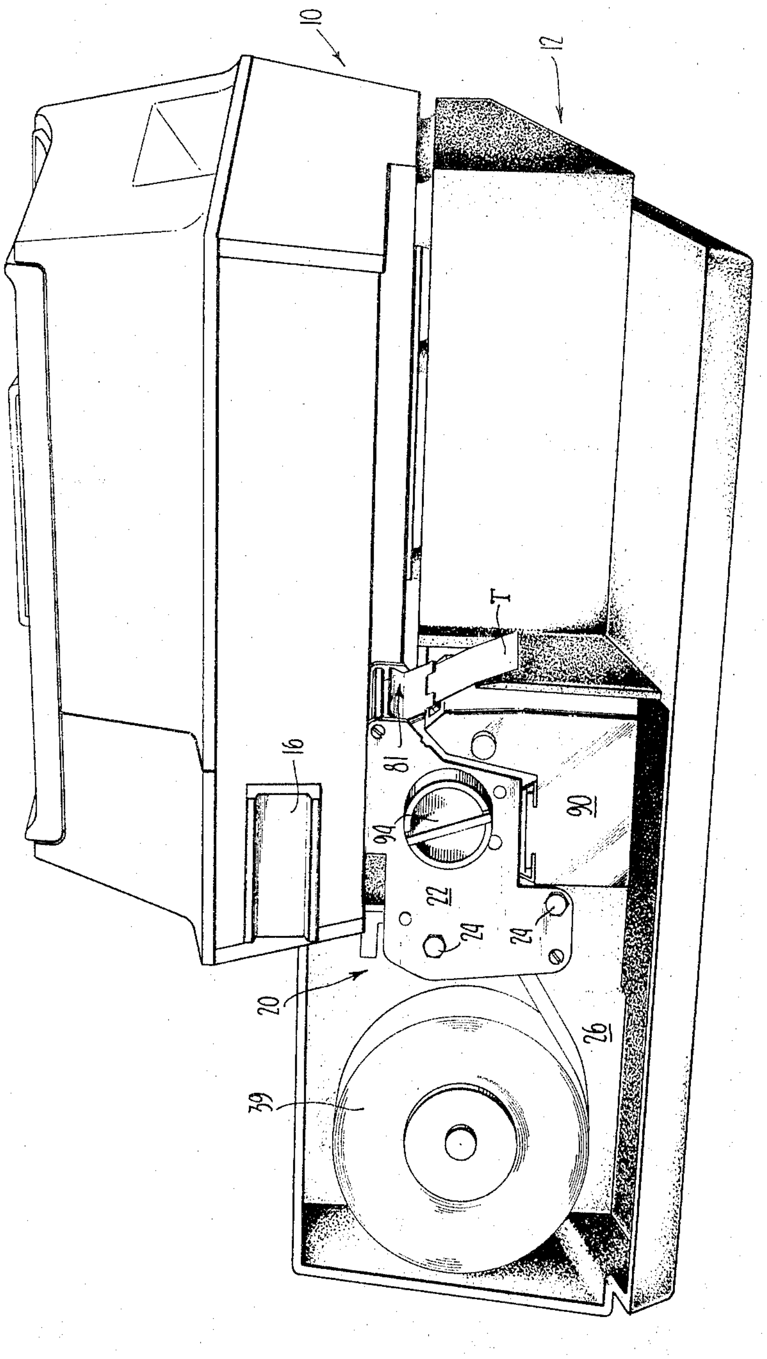
FIG. 1 is a frontal elevational view of the postage metering machine with the cover of the tape control mechanism removed.

A spring 87, secured at one end on a pin on frame member 21 and at its other end on a pin on an arm 88 formed at a right angle to the bar 82, serves to resiliently urge the tape deflector 81 clockwise (FIG. 2) to enable the gummed surface of the dispensed tape to pass over the moistening surface of the wick or sponge shown at 89 in phantom line and submerged in a liquid in moistening tank 90 (FIG. 1).

If it becomes desirable to dispense a strip of tape in a nonmoistened or dry condition, a knob 94 (FIG. 1) may be rotated slightly clockwise to impart a counterclockwise rocking movement to the tape deflector 81 so that the gummed surface of the tape does not contact the sponge 89. For this purpose, knob 94 is secured on shaft 95 (FIG. 4) supported in frame members 21 and 22. Shaft 95 carries an arm 96 secured thereon adjacent frame member 22 with a camming edge 97 thereof engaging a pin 98 secured on an arm 99 formed at a right angle to the bar 83 of the tape deflector 81. Thus, it can be seen that upon angular rotation of the knob 94 in a clockwise direction (FIG. 1), the arm 96 rocks the tape deflector 81 counter-clockwise (FIG. 4) to the position shown in phantom line to dispense the tape in a dry condition.

Approximately four-fifths of the arcual length of the printing die plate 15 on the rotary printing head 14 constitutes the postage indicia, while the remaining, or trailing end, portion of the printing die plate may be blank or may comprise a series of stars or other nondescript characters. This portion of the printing die plate 15 becomes effective following the printing of the postage indicia to move the tape sufficiently through the cutter opening 45 so that a complete indicia will be printed on the severed tape strip.

Following each printing operation, the platen roller 30 is free to be rotated, being out of contact with the rotary print head 14, so that even the slightest retraction of the tape T would cause a partial superimposition of an impression on the tape during a subsequent meter operation. Also, the retraction of the tape T may be sufficient to remove the tape from its contact with the platen 30, whereby a subsequent meter operation would be ineffective to provide a printed strip or postage stamp, resulting in a loss of postage to the user. For this reason, means are provided for preventing a retraction of the tape T following each meter operation and, for detecting a depletion of the tape, whereupon a subsequent meter operation is precluded. Also, as a gummed tape is unreeled from a roll of tightly wound tape, it may tend to adhere to the roll under certain atmospheric conditions thereby causing bunching or looping of the tape and an inconsistent feeding thereof, resulting in the dispensing of an unacceptable tape strip or stamp and loss of postage during the operation. If this condition should occur, sensing means becomes effective to immediately prevent subsequent operations of the postage meter 10.

A lever 104 is rockably mounted on shaft 35, and one arm 105 of the lever is disposed at an acute angle to the path of movement of the tape T, with the tip or vertex of a substantially V-shaped nose 106 of arm 105 disposed in a suitable aperture 107 in upper guide plate 37 for contact with the tape. The tip of the nose 106 of arm 105 is normally maintained in frictional engagement with tape T by means of a spring 108 secured at its one end in a suitable aperture in the upturned lower end of the tape guide plate 37 and supported at its other end on a stud 109 carried by arm 105. The other arm 110 of the lever 104 extends horizontally to the left, as viewed in FIGS. 2 and 5, and serves as a means for manually rocking lever 104 counter-clockwise to enable the threading of the tape T between and through guide plates 37 and 38. Thus, it can be seen that movement of the tape, in the direction of feed only, is possible.

Upon depletion of the tape, the lever 104 becomes effective to preclude a subsequent meter operation. As the end of the tape moves beyond the tip of the nose 106 of arm 105, spring 108 urges lever 104 clockwise (FIG. 2), with the nose 106 dropping into a suitable aperture 111 in lower guide plate 38, the aperture 111 being similar to and aligned with the aperture 107 in upper guide plate 37. As the lever 104 is rocked clockwise under the urgency of spring 108, an arm 115 is likewise rocked clockwise from a latched position shown in FIG. 2 to prevent depression of meter control key 16 (FIG. 1). The stud 109 carried by arm 105 of lever 104 extends laterally thereof through an elongated slot 116 in side member 32 of tape guide bracket 34 and supports one end of a link 117, the other end of which is provided with an elongated slot, engaging a stud 118 on a detent pawl 119 pivotally mounted at 120 on frame member 21. Normally, the stud 118 is maintained in the rightmost end of the elongated slot in link 117 under the urgency of a relatively light spring 121 supported at its one end on a stud 122 carried by pawl 119 and at its other end on a stud 123 carried by arm 115. The spring 121 also serves to resiliently retain a detent notch in the pawl 119 in engagement with a stud 124 on the arm 115 thereby maintaining arm 115 in the inactive position shown in FIG. 2.

A stud 128 is carried by arm 115 (FIGS. 2 and 3) and overlies one end of one offset extension 129 of a rod 130 secured in position for rocking movement on the top plate 63 of the base portion 12 by means of a clamp 131. The outer offset extension 132 of rod 130 is bowed relative to the top plate 63, with its free end extending downwardly through the aperture 67 in the plate 63. At its extremity, the offset extension 132 of the rod 130 is provided with an aperture which serves to support one end of a relatively light spring 133 (FIGS. 6 and 8) which is supported at its other end in the framework of the base 12 and serves to normally urge the offset extension 132 and extension 129 clockwise to maintain extension 129 in engagement with stud 128 on arm 115. With the arms 110 and 115 in the position shown in FIG. 2, the bowed portion of the extension 132 of rod 130 is raised to a position out of the path of travel of the depending extended ear 134 of the postage meter control slide 135 shown in phantom line in FIGS. 6 and 8. The control slide 135, which carries control button 16 (FIG. 1), becomes effective, upon depression of the button 16 and the leftward movement of the slide 135, as viewed in FIG. 8, to initiate a cycle of postage meter operation, as fully described in the aforementioned copending application Ser. No. 486,437.

Figures 6, 7, 8:
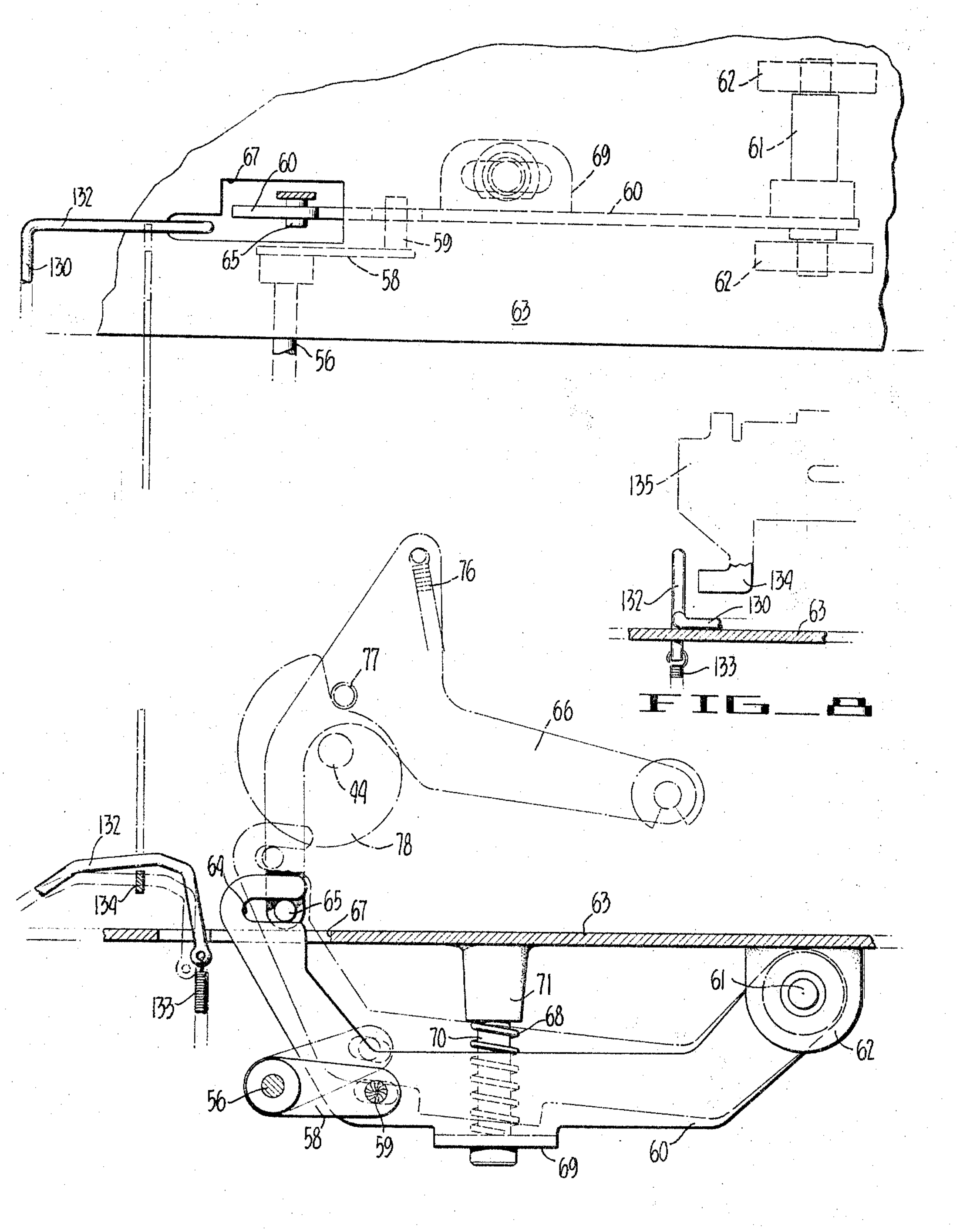
FIGS. 6, 7 and 8 are detail views of the operation control disabling means.

Thus, it can be seen that upon clockwise rocking of the lever 104 and the release of the detent pawl 119, the spring 133 rocks rod 130 clockwise, as viewed in FIGS. 2 and 6, thereby rocking the arm 115 clockwise. Hence, the bowed extension 132 of the rod 130 is moved into the path of travel of the ear 134 on the postage meter control slide 135 to prevent operation of the meter and cyclic rotation of rotary print head 14. It will be noted that the relative strength of the springs involved in the above described operation is such that spring 108 overcomes spring 121 which, in turn, overcomes the tension of the spring 133.

As mentioned hereinbefore, if an adhesion of the gummed tape to the roll at the point of takeoff should occur, whereby the tape would tend to follow the roll counter-clockwise (FIG. 1) during the feeding operation, the tape will contact a laterally extended pin 136 carried at the free end of one arm 137 of a bellcrank 138 pivoted at 139 on frame member 21. A notch is provided in the end portion of the other arm 140 of bellcrank 138 and is adapted to engage a stud 141 secured at the lower end of a depending arm 142 of the detent pawl 119. Normally, the arm 137 of bellcrank 138 rests against a limit stop pin 143 secured on frame member 21. However, upon engagement of the tape T with the extended pin 136, bellcrank 138 is rocked clockwise (FIG. 2) thereby releasing detent pawl 119 to enable spring 133 to move the bowed extension 132 of rod 130 to the position shown in phantom line in FIG. 6 into the path of travel of the ear 134 on control slide 135. Upon release of the detent pawl 119, under either of the conditions described above, the arms 110 and 115 may be manually reset thereby enabling the threading of a new tape between the guides 37 and 38, or the rethreading of the old tape therethrough, and enabling the operation of the meter control button 16.

What is claimed is:

1. In a tape printing device,
a rotary printing head,
an impression roller,
a tape supply including means for guiding the tape to a position between said printing head and said impression roller,
a manually operable means for controlling a cyclic operation of said rotary printing head to print an impression on the tape and to advance a strip of tape in one direction while printing,
means normally engaging said tape operable to prevent retraction of the tape in the other direction,
normally inactive means positionable to disable operation of said manually operable means, and
means biasing said engaging means into engagement with said tape operable to actively position said inactive means upon depletion of said tape supply.

2. In a tape printing device,
a rotary printing head,
an impression roller,
a tape supply including means for guiding the tape to a position between said printing head and said impression roller,
a manually operable means for controlling a cyclic operation of said rotary printing head to print an impression on the tape and to advance a strip of tape in one direction while printing,
means movable from a normally inoperative to an operative position to prevent operation of said manually operable means,
a latch for maintaining said movable means in the inoperative position,
a sensing means associated with said guide means normally engaging the tape to enable movement of the tape in a single direction, and
a resilient means operative to maintain said sensing means in frictional engagement with the tape and effective upon depletion of said tape supply to cause said sensing means to release said latch thereby enabling movement of said movable means to operative position.

3. In a metered mailing machine having a rotary print head for printing a postage impression on a gummed tape and advancing the tape while printing with each cycle of machine operation,
an impression roller,
a tape supply including a guide means for guiding the tape to a printing position between said rotary print head and said impression roller,
a cutter means for severing the printed portion of the tape,
a manually operable control means for initiating a cyclic rotation of said print head, and
a tape control mechanism comprising:
a blocking means movable from a normally inoperative to an operative position to prevent operation of said control means,
a latching means for maintaining said blocking means in the inoperative position,
means normally engaging the tape to enable the movement of the tape in a single direction for a printing operation and rockable to release said latching means to enable operation of said blocking means upon depletion of the tape,
a power means for controlling operation of said engaging means, and
means actuated by a looping of the tape during the movement thereof in said single direction and operable to effect release of said latching means independently of said engaging means.

4. In a device of the character described in claim 3 wherein said blocking means comprises:
a member rockable from a normally inoperative to an operative position to prevent operation of said control means,
means normally biasing said rockable member to the operative position, and
a lever for controlling the rocking movement of said rockable member operable upon release of said latching means to enable operation of said biasing means.

5. In a device of the character described in claim 4 wherein said latching means comprises:

a detent pawl normally operative to latch said control lever to maintain said rockable member in the inoperative position against the urgency of said biasing means, and means connecting said pawl with said tape engaging means operable to unlatch said pawl upon rocking of said engaging means by said power means.

6. In a device of the character described in claim 5 wherein said power means comprises:

a spring operable to urge said tape engaging means to a nonengaging position upon depletion of the tape supply.

7. In a device of the character described in claim 6 wherein said tape engaging means comprises:

a rockable arm having an angular tip portion thereof normally engaging the tape at an acute angle to restrict movement of the tape to a single direction and operable to release said pawl under the urgency of said spring upon passage of the tape beyond the point of engagement of said arm with the tape.

References Cited

UNITED STATES PATENTS

| | | | |
|---|---|---|---|
| 2,235,130 | 3/1941 | Webb | 101—227 XR |
| 2,377,523 | 6/1945 | Ryan et al. | 101—227 XR |
| 2,775,196 | 12/1956 | Miles | 101—233 XR |
| 2,996,001 | 8/1961 | Schlegel et al. | 101—227 |

ROBERT E. PULFREY, *Primary Examiner.*

J. REED FISHER, *Assistant Examiner.*

U.S. Cl. X.R.

101—227, 233